UNITED STATES PATENT OFFICE.

GEORG HARSTER, OF SPEYER, GERMANY.

METHOD OR PROCESS OF PREVENTING CLOSING OF CUT FLOWERS OF THE ORDER NYMPHÆACEÆ.

SPECIFICATION forming part of Letters Patent No. 607,038, dated July 12, 1898.

Application filed December 11, 1893. Serial No. 493,425. (No specimens.) Patented in Germany June 21, 1891, No. 61,971, and September 13, 1893, Nos. 79,992 and 80,764; in France September 14, 1891, No. 216,102, and September 25, 1893, No. 233,038; in Belgium November 9, 1893, No. 107,100; in England November 11, 1893, No. 21,528, and in Austria-Hungary November 23, 1893, No. 60,729 and No. 20,157.

*To all whom it may concern:*

Be it known that I, GEORG HARSTER, florist, of 27 Wormserstrasse, Speyer, on the Rhine, in the Empire of Germany, have invented a new and useful Method or Process of Preventing the Closing of Cut Flowers of the Order *Nymphæaceæ*, of which the following is a specification.

The invention which is the subject-matter of this application has been made the subject-matter of foreign patents as follows: Germany, No. 61,971, dated June 21, 1891, and No. 79,992, dated September 13, 1893, and No. 80,764, dated September 13, 1893; France, No. 216,102, dated September 14, 1891, and No. 233,038, dated September 25, 1893; British, No. 21,528, dated November 11, 1893; Belgium, No. 107,100, dated November 9, 1893, and Austria-Hungary, No. 60,729 and No. 20,157, dated November 23, 1893.

The flowers of plants of the order *Nymphæaceæ* close and open periodically either in the daytime or in the night, and this is also the same with their cut flowers. This may, however, be prevented and the flowers kept open by destroying, either partially or entirely, the active power of the cellular tissue of the torus.

On account of the exceedingly great sensitiveness of the protoplasm (on which the life of the cells of the plants depends) to exterior influences various mediums, either chemical, electrical, or thermal, may cause a momentary or a lasting suspension of the life of the plant and eventually the complete destruction of the cellular tissue.

The interior as well as the exterior formation of the blossoms of the *Nymphæaceæ* is exceedingly suitable for my purpose, as the stems of these flowers are provided with a number of small and several large tube-like channels, which reach uninterruptedly up to the torus or receptacle and contain in their natural state air or gases. These channels may serve, so to speak, as conduit-tubes, through which liquid or gaseous mediums can be introduced into the cellular texture or tissue of the torus or receptacle, where they are at once absorbed owing to the sponge-like condition of the cellular texture or tissue.

By simply dipping the stems of the cut flowers into a solution containing a metallic salt—such, for example, as chrome-alum in water—the solution will in most cases pass without trouble even through the smallest air-channels or capillary tubes in the stem up to the torus or receptacle. When, however, the mere dipping of the flowers does not give the desired result, the only method is to stand the cut flowers for a short time in the solution, when a small portion of it will enter the larger air-channels. This, then, may be compelled to travel farther along to the cellular texture or tissue of the torus or receptacle by means of centrifugal force by blowing into it or by suspending the flowers in a reversed position, whereupon it becomes instantly absorbed. It is clear that the medium does not reach the torus or receptacle in the natural way of the sap, and therefore the desired result can as well be obtained by introducing the medium, if a liquid, directly into the cellular texture or tissue of the torus or receptacle by means of an injector, for which purpose the point of a syringe may be inserted at the base of the leaves or through the stigma. The excess dose will flow through the air-channels or capillary tubes and leave at the lower extremity of the stem. Electrical discharges have also given good results.

The cut end of the stem is brought into contact with one of the wires of a battery or generator while the points of the leaves of the flowers are dipped into a vessel containing water, which is in electrical contact with the other wire in such a manner as to cause the discharge-currents to pass through it. Lastly, it may be said that thermal influences produce similar effects. The flowers are dipped into water of a temperature of about 50° centigrade, but not above 57°. It is sufficient to dip the flowers with their stems just up to the base of the leaves into the water, so as to heat only the torus or receptacle.

The procedure for low temperatures is similar to the foregoing and should be conducted at somewhere near 0° centigrade. It will be seen that the range of temperature of the heating and the cooling processes are considerable, and it may therefore be found preferable to gradually cool or heat the flowers, whereby the differences in the temperatures may be made to extend to 57° centigrade.

The process to be adopted depends mainly on the formation of the interior and the exterior, on the colors, and on the perfume of the flowers to be treated; also on the various classes and on the weather which existed at the time when the bud first developed; also the time of day when the flower is cut has to be taken into account, and especially the conditions of the prevailing temperature and of the season.

The conditions enumerated have to be taken into account especially in choosing a chemical medium for treatment and to some degree also in respect to the strength of the electrical discharge and the degree of heating or cooling.

It is not possible to state the specific process of operation by which my invention may be employed in all cases with all flowers without experiment, for the reason that the flowers behave so differently under differing conditions. Not only have the class of flower, the color, the smell, and the weather at the moment an influence, but also the conditions of life under which the flower has grown, the greater or lesser sensitiveness to external influences, and the health of the plant. Considering the great number of influences which come into action in the treatment of plants in accordance with this process, it is not possible to make general rules for guidance in all cases. The following plan, however, will enable an expert to obtain the results desired: Take plants grown together under the same conditions, as far as possible, and when in bloom a few samples of the flowers are selected and treated by the various methods set forth in this specification to ascertain the one which in the case of the particular flower under consideration will most effectually destroy, partially or totally, the life of the cellular texture or tissue in the interior of the torus or receptacle. Then the remainder of the flowers may be treated by the same process. The easiest and surest process is the chemical—that is, the impregnation of the flowers with salts, especially heavy metal salts. The following salts are specially applicable: chrome-alum, (sulfate of chromium and potassium,) nitrate of nickel, manganese, and cobalt. Chrome-alum is applied as a concentrated solution. The concentration of the nitrate must be decided by experiment, as it depends upon the various conditions mentioned above. It varies generally from 1.05 to 2 specific gravity. Of the salt solution one-tenth of a cubic centimeter is generally enough. It is important that the correct layer of the bottom of the bloom be reached by the point of a syringe when it is used for the injection of the chemical. A knowledge of the anatomy of these different parts of the flowers is therefore necessary. When the flower is completely saturated with a suitable solution, it will remain open.

In some instances it may be an advantage to use a combination of two or several of the before-named methods or processes, either simultaneously or successively. It has already been stated that for the chemical treatment in most cases a watery solution of the salts of heavy metals has been found most suitable.

The main point to observe in the process is to destroy the life of the cellular texture or tissue in the interior lower part of the torus or receptacle only.

What I claim, and desire to secure by Letters Patent of the United States, is—

The method or process of preventing the closing of cut flowers of the order *Nymphæaceæ* by destroying either partially or totally the life of the cellular texture or tissue in the interior of the torus or receptacle, substantially as described.

GEORG HARSTER.

Witnesses:
A. B. BEYREUTHER,
MARCUS GOLDFINGER.